United States Patent
Kitada

(10) Patent No.: US 9,658,677 B2
(45) Date of Patent: May 23, 2017

(54) WAKE-UP SIGNAL GENERATING DEVICE, AND TOUCH INPUT DEVICE

(71) Applicant: Murata Manufacturing Co., Ltd., Nagaokakyo-shi, Kyoto-fu (JP)

(72) Inventor: Hiroaki Kitada, Nagaokakyo (JP)

(73) Assignee: MURATA MANUFACTURING CO., LTD., Nagaokakyo-Shi, Kyoto-Fu (JP)

(*) Notice: Subject to any disclaimer, the term of this patent is extended or adjusted under 35 U.S.C. 154(b) by 66 days.

(21) Appl. No.: 14/683,772

(22) Filed: Apr. 10, 2015

(65) Prior Publication Data

US 2015/0212571 A1 Jul. 30, 2015

Related U.S. Application Data

(63) Continuation of application No. PCT/JP2013/079491, filed on Oct. 31, 2013.

(30) Foreign Application Priority Data

Nov. 7, 2012 (JP) .................................. 2012-245012

(51) Int. Cl.
*G06F 3/041* (2006.01)
*G06F 1/32* (2006.01)
(Continued)

(52) U.S. Cl.
CPC ............ *G06F 1/3262* (2013.01); *G06F 3/017* (2013.01); *G06F 3/041* (2013.01); *G06F 3/0416* (2013.01);
(Continued)

(58) Field of Classification Search
CPC ........ G06F 1/3262; G06F 3/017; G06F 3/041; G06F 3/0416; G06F 3/0414;
(Continued)

(56) References Cited

U.S. PATENT DOCUMENTS 5,298,602 A * 3/1994 Shikinami ................. A61F 2/28
252/62.9 R
7,176,902 B2 2/2007 Peterson, Jr. et al.
(Continued)

FOREIGN PATENT DOCUMENTS

CN 101763160 A 6/2010
CN 102460351 A 5/2012
(Continued)

OTHER PUBLICATIONS

International Search Report for PCT/JP2013/079491, date of mailing Jan. 21, 2014.
(Continued)

*Primary Examiner* — Jason Olson
(74) *Attorney, Agent, or Firm* — Arent Fox LLP

(57) ABSTRACT

A touch input device includes a touch sensor and a wake-up control unit. The touch sensor includes a piezoelectric sensor and a detection signal generating unit. The touch sensor outputs sensing signals corresponding to displacement amount of a push and relaxation of the push of an operation surface, and a displacement direction. The detection signal generating unit outputs a displacement detection signal from the sensing signal. The wake-up control unit detects a push from a change in a voltage of the displacement detection signal. The wake-up control unit starts clocking upon detection of the push, and generates and outputs a wake-up signal when detecting relaxation of the push based on the change in the voltage of the displacement detection signal within a detection time.

23 Claims, 10 Drawing Sheets

(51) Int. Cl.
*H04M 1/725* (2006.01)
*G06F 3/01* (2006.01)
(52) U.S. Cl.
CPC ....... *H04M 1/72519* (2013.01); *G06F 3/0414* (2013.01); *G06F 2203/04105* (2013.01); *H04M 2250/22* (2013.01)
(58) Field of Classification Search
CPC .... G06F 2203/04105; H04M 1/72519; H04M 2250/22
USPC ......................................................... 345/174
See application file for complete search history.

(56) References Cited

U.S. PATENT DOCUMENTS

| | | | | |
|---|---|---|---|---|
| 7,277,087 | B2* | 10/2007 | Hill ..................... | G06F 3/0436 178/18.01 |
| 8,199,126 | B1* | 6/2012 | Taubman ................ | G06F 3/011 345/156 |
| 2004/0138849 | A1* | 7/2004 | Schmidt ................ | G06F 3/0414 702/127 |
| 2006/0244732 | A1* | 11/2006 | Geaghan ................ | G06F 3/041 345/173 |
| 2011/0057903 | A1* | 3/2011 | Yamano ................ | G06F 3/0237 345/174 |
| 2011/0080367 | A1* | 4/2011 | Marchand ............. | G06F 1/3215 345/174 |
| 2011/0298740 | A1* | 12/2011 | Miyazaki .............. | G06F 1/1633 345/173 |
| 2011/0304567 | A1* | 12/2011 | Yamamoto ............ | G06F 3/0416 345/173 |
| 2012/0105358 | A1* | 5/2012 | Momeyer ............. | G06F 3/0414 345/174 |
| 2013/0157561 | A1 | 6/2013 | Tamai et al. | |
| 2014/0098065 | A1* | 4/2014 | Deichmann ........... | G06F 3/0421 345/175 |
| 2014/0327805 | A1 | 11/2014 | Oyama | |
| 2016/0034073 | A1 | 2/2016 | Andoh | |

FOREIGN PATENT DOCUMENTS

| | | |
|---|---|---|
| CN | 102609209 A | 7/2012 |
| CN | 102724365 A | 10/2012 |
| JP | H09-6535 A | 1/1997 |
| JP | 2007-508619 A | 4/2007 |
| JP | 2007-250015 A | 9/2007 |
| JP | 2011-039990 A | 2/2011 |
| JP | 2012-046283 A | 3/2012 |
| JP | 2012-190694 A | 10/2012 |
| JP | 2012-208795 A | 10/2012 |

OTHER PUBLICATIONS

Written Opinion of the International Searching Authority for PCT/JP2013/079491, date of mailing Jan. 21, 2014.

* cited by examiner

WAKE-UP SIGNAL GENERATING DEVICE, AND TOUCH INPUT DEVICE

CROSS-REFERENCE TO RELATED APPLICATIONS

The present application is a continuation of PCT/JP2013/079491 filed Oct. 31, 2013, which claims priority to Japanese Patent Application No. 2012-245012, filed Nov. 7, 2012, the entire contents of each of which are incorporated herein by reference.

FIELD OF THE INVENTION

The present invention relates to a wake-up signal generating device which generates a wake-up signal of a device using a signal from a push detection sensor, and a touch input device which includes the wake-up signal generating device.

BACKGROUND OF THE INVENTION

In recent years, various mobile devices having at least one of a power saving mode and a sleep mode are being put in practical use to suppress consumption power of the mobile devices. A mobile device having the power saving mode and the sleep mode does not simultaneously activate or stop all functions by collectively operating all power supplies of the mobile device. The mobile device having the power saving mode and the sleep mode stops power supply to functional units such as a CPU and a display panel (e.g. a LCD) whose consumption power is high and, only when necessary, supplies power to the functional units whose consumption power is high.

To cancel such a partial stop state and cause a transition to a normal operation state of supplying power to the function units whose consumption power is high, some trigger needs to be given. At present, a mechanical switch is usually used as means for giving this trigger.

However, the mobile device tends more to use a touch input device such as a touch panel without using a mechanical which is exposed to an external surface to improve design and the waterproof property.

Patent Literature 1 discloses using such a touch input device, and causing transition from a stop state to a normal operation state when the touch input device is touched.

PTL 1: Japanese Translation of PCT Application Laid-Open No. 2007-508619

In many instances, the mobile device is usually carried in a state where the mobile device is put in a bag and the like.

When the mobile device is carried, the mobile device may contact another object in the bag or receive a shock applied while being carried, and therefore the touch input device is likely to detect a touch likewise as if the touch input device were touched.

Hence, in Patent Literature 1, a threshold for a press strength of a touch is provided, and it is determined that an intentional input is made when the press strength exceeds the threshold, so that activation processing is performed to cause the transition from a stop state to a normal operation state.

However, when a pressing force exceeding the threshold is applied due to at least one of the above shock and contact with another object, even an unintentional input triggers execution of the activation processing.

SUMMARY OF THE INVENTION

An object of the present invention is to provide a wake-up signal generating device which prevents an erroneous operation of activation processing caused by an unintentional touch and the like, and a touch input device which includes the wake-up signal generating device.

A wake-up signal generating device according to the present invention includes a displacement detecting unit and a wake-up control unit. The displacement detecting unit generates a displacement detection signal corresponding to a displacement amount of an operation surface produced by a push and relaxation of the push, and a displacement direction. The wake-up control unit detects using the displacement detection signal that the displacement amount increases and then the displacement amount decreases, and generates a wake-up signal.

According to this configuration, not only with detection of the push with respect to the operation surface but also with detection of the relaxation of the push, a wake-up signal is outputted. Consequently, it is possible to prevent an erroneous activation caused by an unintentional touch.

Further, preferably, the wake-up signal generating device according to the present invention employs the following configuration. The wake-up control unit generates the wake-up signal when detecting the decrease in the displacement amount within a predetermined time from a point of time at which the increase in the displacement amount is detected.

According to this configuration, a time from detection of an increase in the displacement amount to detection of a decrease in the displacement amount is limited. Consequently, it is possible to more reliably prevent an erroneous activation caused by an unintentional touch.

Further, the wake-up signal generating device according to the present invention may employ the following configuration. The wake-up control unit generates the wake-up signal when detecting, using the displacement detection signal, that a displacement amount of first displacement increases and then the displacement amount decreases due to n-th displacement (n is an integer equal to or more than 2) subsequent to the first displacement.

According to this configuration, unless a combination of a push and relaxation of the push is carried out continuously a plurality of times, the wake-up signal is not outputted. Consequently, it is possible to more reliably prevent an erroneous activation caused by an unintentional touch.

Further, preferably, the wake-up signal generating device according to the present invention employs the following configuration. The wake-up control unit generates the wake-up signal when detecting the decrease in the displacement amount of the n-th displacement (n is an integer equal to or more than 2) within a predetermined time from a point of time at which the increase in the displacement amount of the first displacement is detected.

According to this configuration, the time interval from a first-time push and relaxation of the first-push to a second-time push and relaxation of the second-push is limited. Consequently, it is possible to more reliably prevent an erroneous activation caused by an unintentional touch.

Further, preferably, the wake-up signal generating device according to the present invention employs the following configuration. The displacement detecting unit includes a wake-up preparation signal generating unit which detects the increase in the displacement amount using the displacement detection signal, generates a wake-up preparation signal and outputs the wake-up preparation signal to the wake-up control unit. The wake-up control unit detects an increase in the displacement amount using the wake-up preparation signal.

According to this configuration, the displacement detecting unit detects the increase in the displacement amount, and therefore, when the increase in the displacement amount is detected, the wake-up control unit is stopped. Consequently, the wake-up signal generating device can be configured to save more power.

Further, preferably, the wake-up signal generating device according to the present invention employs the following configuration. The displacement detecting unit includes a displacement sensing element and a detection signal generating unit. The displacement sensing element generates a sensing signal corresponding to the displacement amount and the displacement direction. The detection signal generating unit slows a temporal displacement amount of the sensing signal, and generates the displacement detection signal.

According to this configuration, it is possible to more reliably detect an increase and a decrease in the displacement amount while increasing sensitivity of the operation surface with respect to displacement.

Further, preferably, the wake-up signal generating device according to the present invention employs the following configuration. The displacement sensing element includes a piezoelectric film which is disposed in the operation surface, and a conductor which is formed in the piezoelectric film.

According to this configuration, it is possible to realize a thin displacement sensing element which has high sensitivity with respect to displacement.

Further, preferably, the wake-up signal generating device according to the present invention employs the following configuration. The piezoelectric film is made of at least polylactic acid which is stretched in a uniaxial direction.

According to this configuration, it is possible to realize a thin displacement sensing element which has high sensitivity with respect to displacement and is not influenced by ambient temperature.

Further, the touch input device according to the present invention has the following features. A touch input device includes the wake-up signal generating device described in one of the above paragraphs. The wake-up control unit outputs the wake-up signal and the displacement detection signal.

According to this configuration, it is possible to realize a touch input device which hardly causes an erroneous activation and can detect the amount of push with respect to the operation surface.

Further, the touch input device according to the present invention may have the following configuration. The displacement detecting unit includes a position detecting unit which detects a touch position of an operation surface, and generates a position detection signal. The wake-up control unit outputs the wake-up signal and the position detection signal.

According to this configuration, it is possible to realize a touch input device which hardly causes an erroneous activation and can detect the amount of push with respect to the operation surface, and an operation position.

According to the present invention, it is possible to prevent an erroneous operation of activation processing caused by an unintentional touch and the like.

DETAILED DESCRIPTION OF THE EXEMPLARY EMBODIMENTS

Figure 1:
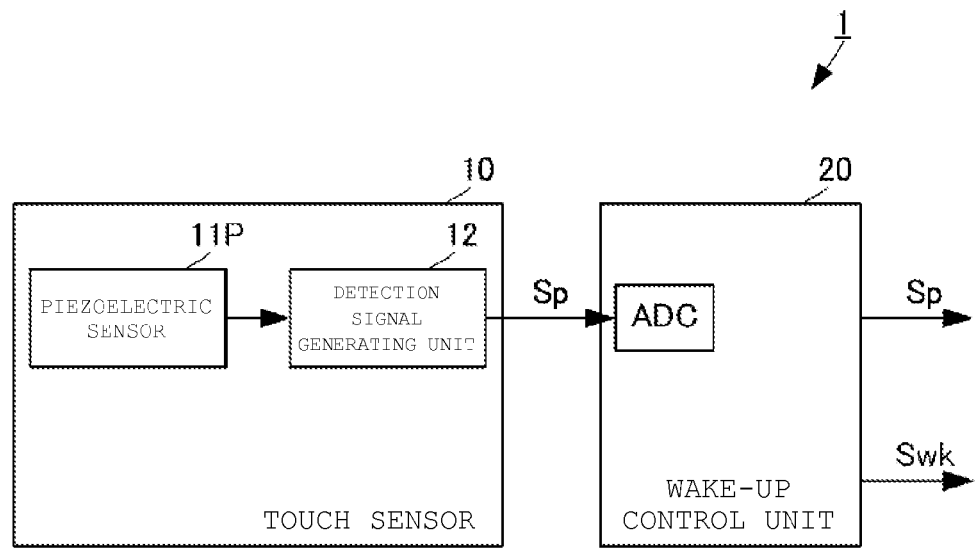
FIG. 1 is a block diagram of a touch input device according to a first embodiment of the present invention.

A touch input device according to the first embodiment of the present invention will be described with reference to the drawings. FIG. 1 is a block diagram of the touch input device according to the first embodiment of the present invention. The touch input device which outputs a wake-up signal and a displacement detection signal as described later will be described as an example in the present embodiment. However, the wake-up signal generating device is applicable when the wake-up signal generating device outputs only a wake-up signal.

Further, when an operation surface of a touch input device 1 according to the present embodiment is so-called long-pushed, an electronic device to which the touch input device 1 is attached is activated.

The touch input device 1 includes a touch sensor 10 and a wake-up control unit 20. The touch sensor 10 corresponds to a "displacement detecting unit" of the present invention. The touch sensor 10 includes a piezoelectric sensor 11P and a detection signal generating unit 12. The piezoelectric sensor 11P corresponds to a "displacement sensing element" of the present invention.

Although a specific example of a preferred configuration will be described later, the piezoelectric sensor 11P includes a piezoelectric film made of polylactic acid and the like having piezoelectricity, and displacement sensing conductors formed in both opposing principal surfaces of the piezoelectric film. The piezoelectric sensor 11P is disposed such that one principal surface functions as an operation surface. The piezoelectric sensor 11P senses a displacement amount of a push and relaxation of this push, and a displacement direction when an operator pushes the principal surface or when the push is relaxed, and outputs a sensing signal. A signal level of the sensing signal is uniquely determined based on the amount of displacement and displacement direction.

For example, the piezoelectric sensor 11P instantaneously produces a positive potential difference having a magnitude corresponding to a displacement amount produced when the operation surface is pushed, and instantaneously produces a negative potential difference having a magnitude corresponding to the displacement amount when the push with respect to the operation surface is released. This potential difference converges to 0 when the displacement amount does not change.

The detection signal generating unit 12 is connected to a pair of displacement sensing conductors in the piezoelectric sensor 11P. The detection signal generating unit 12 is configured by, for example, an integration circuit. The detection signal generating unit 12 generates a displacement detection signal Sp whose voltage changes based on a potential difference determined by a displacement amount and a displacement direction.

Figure 2:
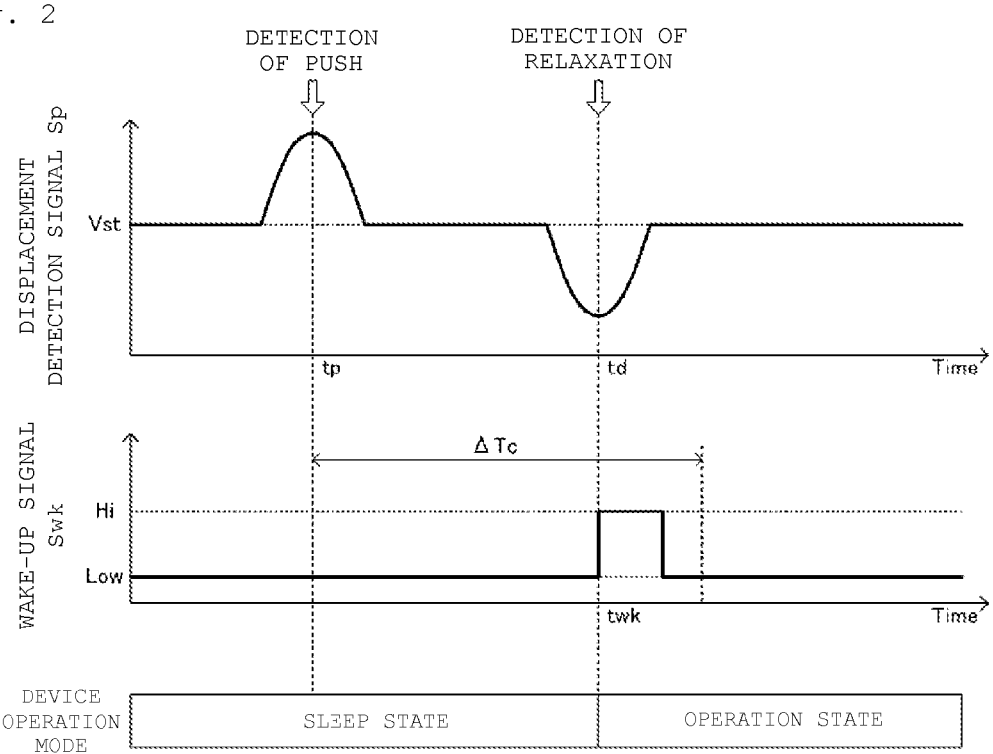
FIG. 2 is a diagram illustrating transitions of a displacement detection signal, a wake-up signal and a device operation mode of the touch input device according to the first embodiment of the present invention.

FIG. 2 is a diagram illustrating transitions of a displacement detection signal, a wake-up signal and a device operation mode of a touch input device according to the first embodiment of the present invention.

More specifically, in a stationary state where the displacement amount does not change, a potential difference is not produced between the displacement sensing conductors of the piezoelectric sensor 11P. In this case, the displacement detection signal Sp is fixed at a reference voltage Vst as illustrated in FIG. 2.

When the operation surface is pushed and a positive potential difference is produced between the displacement sensing conductors, the voltage of the displacement detection signal Sp becomes higher than the reference voltage Vst, and returns to the reference voltage Vst after reaching a maximal value. In this regard, the voltage of the displacement detection signal Sp rises in a state where a temporal change is slow, and then lowers as illustrated in FIG. 2 according to a time constant of the integration circuit of the detection signal generating unit 12. That is, it is possible to slow a temporal change of a voltage value for a sensing signal.

When a push with respect to the operation surface is relaxed and a negative potential difference is produced between the displacement sensing conductors, the voltage of the displacement detection signal Sp becomes lower than the reference voltage Vst, and returns to the reference voltage Vst after reaching a maximal value. In this regard, the voltage of the displacement detection signal Sp lowers in a state where a temporal change is slow, and then rises as illustrated in FIG. 2 according to a time constant of the integration circuit of the detection signal generating unit 12.

The displacement detection signal Sp which produces such a voltage change is inputted to the wake-up control unit 20.

The wake-up control unit 20 includes a microcomputer and the like, and is configured to save power more than a main control unit of the electronic device to which the touch input device 1 is attached. The wake-up control unit 20 includes an ADC (analog/digital converting circuit). The ADC samples the displacement detection signal Sp at a predetermined sampling cycle, and converts the displacement detection signal Sp into a digital signal.

Figure 3:
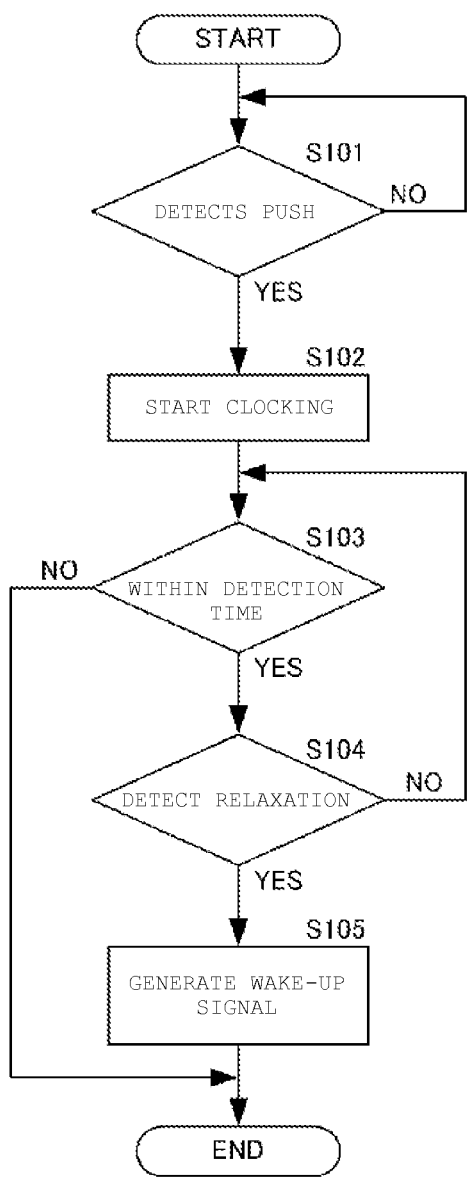
FIG. 3 is a flowchart illustrating a processing flow for generating a wake-up signal Swk according to the first embodiment of the present invention.

The wake-up control unit 20 continuously observes the displacement detection signal Sp, and generates a wake-up signal Swk by processing illustrated in FIG. 3. FIG. 3 is a flowchart illustrating a processing flow for generating the wake-up signal Swk according to the first embodiment of the present invention.

First, the wake-up control unit 20 detects that the displacement detection signal Sp has reached the maximal value. That is, the wake-up control unit 20 detects that the operation surface has been pushed (S101: YES). In this regard, the wake-up control unit 20 continues detecting this push (maximum value) until the push is detected, i.e., the maximal value of the displacement detection signal Sp is observed (S101: NO).

When detecting that the operation surface has been pushed (S101: YES), the wake-up control unit 20 starts clocking based on this detection timing as a clocking start time tp (S102). In this regard, a detection time $\Delta Tc$ during which the clocking is to be performed is a time set in advance, and is preferably about 1 second to 2 seconds, for example. Meanwhile, the detection time $\Delta Tc$ takes a value which can be optionally set, and can be set according to erroneous activation prevention conditions.

When the time is within the detection time $\Delta Tc$ (S103: YES), the wake-up control unit 20 continues detecting a minimal value until relaxation of the push, i.e., the minimal value of the displacement detection signal Sp is detected (S104: No). The wake-up control unit 20 stops wake-up signal generation processing when relaxation of the push, i.e., the minimal value of the displacement detection signal Sp is not detected within the detection time $\Delta Tc$ (S103: NO).

When detecting the minimal value of the displacement detection signal Sp, i.e., the relaxation of the push (S104: YES), the wake-up control unit 20 generates and outputs the wake-up signal Swk (S105). The wake-up signal Swk is a pulse signal which transitions from a Low state to a Hi state at a detection timing td of relaxation of a push as a state transition timing twk as illustrated in, for example, FIG. 2, and maintains the Hi state for a predetermined period of time.

The electronic device to which the touch input device 1 is attached executes activation processing when receiving an input of the wake-up signal Swk of the Hi state. The electronic device transitions from a sleep state to an operation state, and executes a predetermined function.

The above configuration and processing are used, so that, even when the operation surface is pushed since the operation surface contacts another object in a bag or receives a shock and the like while being carried, the wake-up signal Swk is not outputted in response to the push alone. Consequently, it is possible to prevent an erroneous activation of the electronic device. It is possible to provide this effect without providing a time (detection time $\Delta Tc$) from detection of a push to detection of relaxation of the push.

It is possible to more reliably prevent the wake-up signal Swk from being unintentionally outputted, by using the above configuration and processing and limiting the detection time $\Delta Tc$.

In addition, the wake-up control unit 20 starts outputting the wake-up signal Swk and outputting the displacement detection signal Sp. The electronic device can receive an input of an operation with respect to the operation surface of the touch sensor 10 by using this displacement detection signal Sp, and execute a predetermined function.

Figure 4:
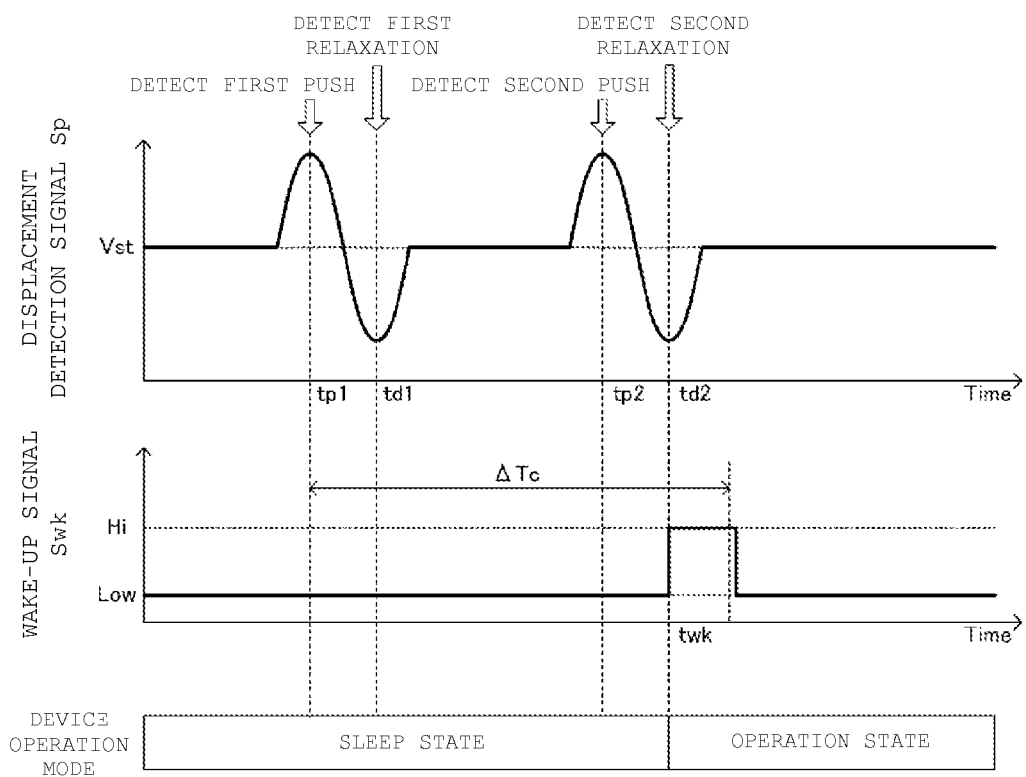
FIG. 4 is a diagram illustrating transitions of a displacement detection signal, a wake-up signal and a device operation mode of a touch input device according to a second embodiment of the present invention.
Figure 5:
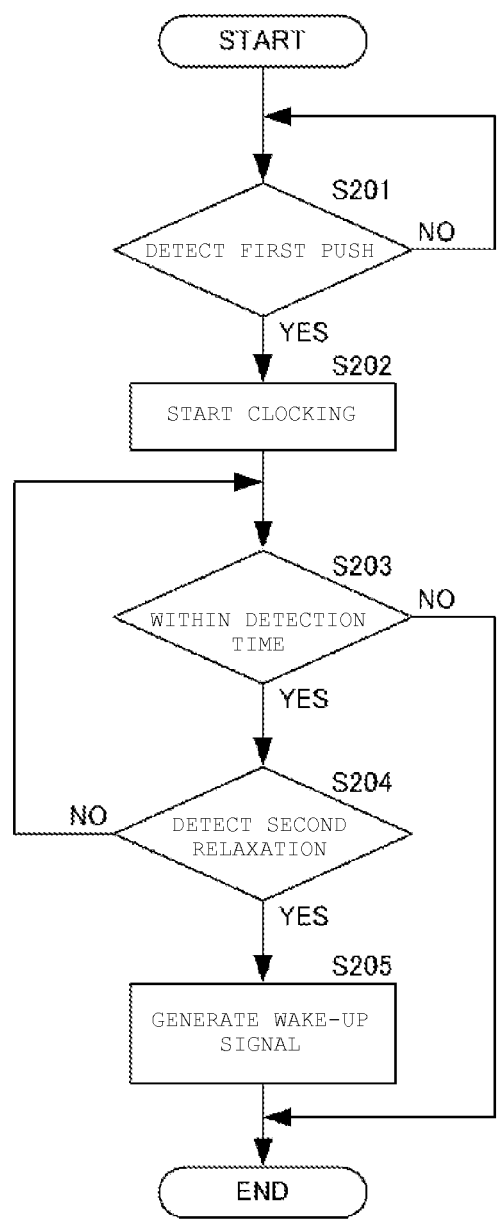
FIG. 5 is a flowchart illustrating a processing flow for generating a wake-up signal Swk according to the second embodiment of the present invention.

Next, a touch input device according to a second embodiment will be described with reference to the drawings. FIG. 4 is a diagram illustrating transitions of a displacement detection signal, a wake-up signal and a device operation mode of the touch input device according to the second embodiment of the present invention. FIG. 5 is a flowchart illustrating a processing flow for generating a wake-up signal Swk according to the second embodiment of the present invention.

The touch input device according to the present embodiment differs from the touch input device according to the first embodiment only in processing of a wake-up control unit 20, and the other configuration and processing are the same as those of the touch input device according to the first embodiment. Hence, only processing of the wake-up control unit 20 will be more specifically described.

Roughly speaking, the touch input device according to the present embodiment generates the wake-up signal Swk based on a continuous operation (so-called double tap) of two pairs of a push and relaxation of the push.

First, the wake-up control unit 20 detects that a displacement detection signal Sp has reached a maximal value. That is, the wake-up control unit 20 detects that the operation surface has been pushed for the first time (first-pushed) (S201: YES). In this regard, the wake-up control unit 20 continues detecting this first push (first maximal value) until the first push is detected, i.e., the first maximal value of the displacement detection signal Sp is observed (S201: NO).

When detecting that the operation surface has been first-pushed (S201: YES), the wake-up control unit 20 starts clocking based on this detection timing as a clocking start time tp1 (S202). In this regard, a detection time ΔTc during which the clocking is to be performed is a time set in advance similarly to the first embodiment.

When the time is within the detection time ΔTc (S203: YES), the wake-up control unit 20 continues detecting a second minimal value until relaxation of a second-time push (relaxation of the second push), i.e., the second-time minimal value (second minimal value) of the displacement detection signal Sp is detected (S204: No). In addition, the wake-up control unit 20 stops wake-up signal generation processing when relaxation of the second push, i.e., the second minimal value of the displacement detection signal Sp is not detected within the detection time ΔTc (S203: NO).

In this regard, relaxation of the second-time push is defined as follows. First, as illustrated in FIG. 2, the first-time push (first push) and relaxation of the first-time push (relaxation of the first push) are detected based on a voltage value of the displacement detection signal Sp. After this pair of the first-time push and the relaxation of the push are detected, a second-time push (second push) and relaxation of the second-time push (relaxation of the second push) are detected based on a voltage value of the displacement detection signal Sp.

When detecting the second minimal value of the displacement detection signal Sp, i.e., the relaxation of the second push (S204: YES), the wake-up control unit 20 generates and outputs the wake-up signal Swk (S205). The wake-up signal Swk is a pulse signal which transitions from a Low state to a Hi state at a detection timing td2 of relaxation of a push as a state transition timing twk as illustrated in, for example, FIG. 4, and maintains the Hi state for a predetermined period of time.

The electronic device to which the touch input device 1 is attached executes activation processing when receiving an input of the wake-up signal Swk of the Hi state. The electronic device transitions from a sleep state to an operation state, and executes a predetermined function.

Even when the above configuration and processing are used, it is possible to prevent an erroneous activation of the electronic device to which the touch input device is attached. Further, according to the configuration of the present embodiment, unless an operation of a pair of a push and relaxation of the push is detected a plurality of times, the wake-up signal Swk is not generated. Consequently, it is possible to more reliably prevent an erroneous activation. The above embodiment describes a case where the wake-up signal Swk is generated in response to the two times of detection where n is 2. However, the embodiment is not limited to this, and the wake-up signal Swk may be generated in response to three times or more detection.

Figure 6:
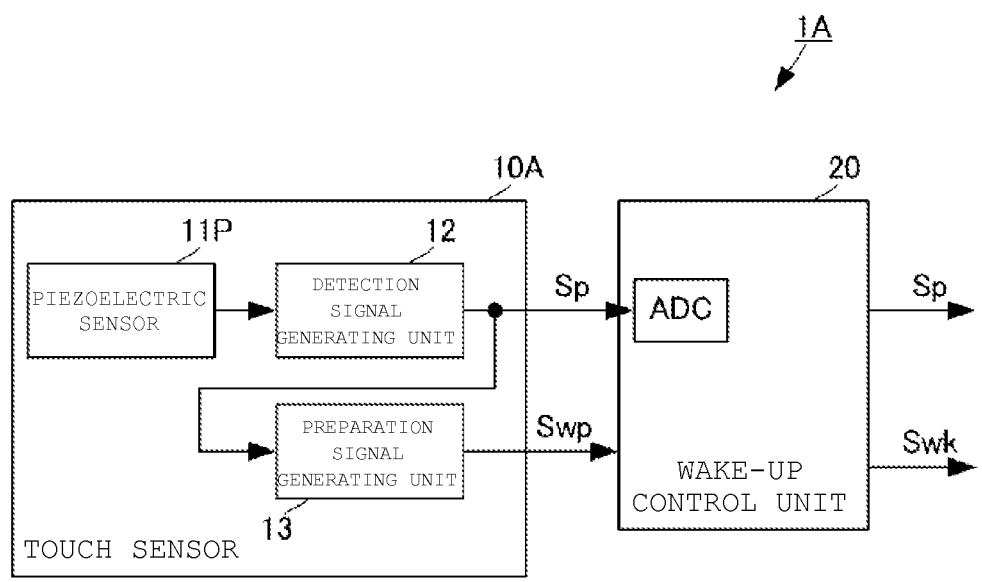
FIG. 6 is a block diagram of a touch input device according to a third embodiment of the present invention.
Figure 7:
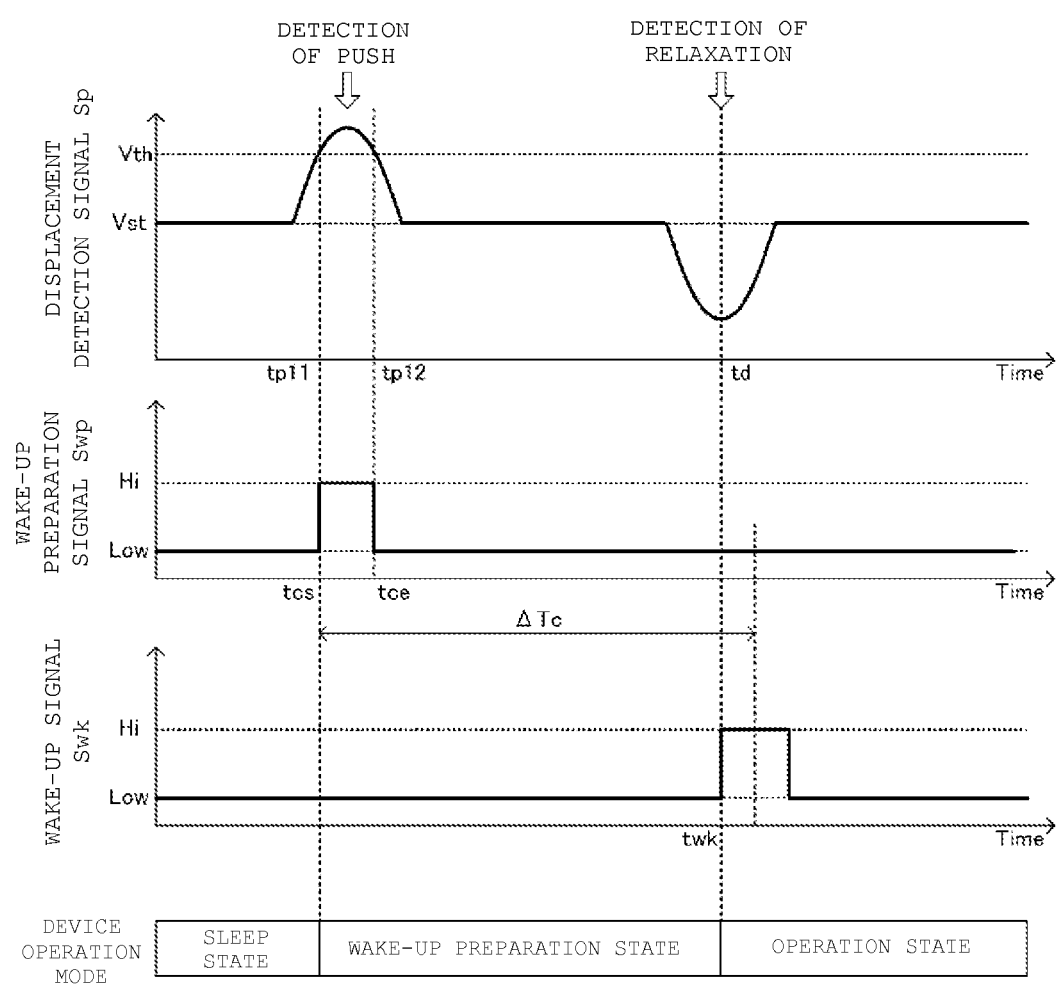
FIG. 7 is a diagram illustrating transitions of a displacement detection signal, a wake-up preparation signal, a wake-up signal and a device operation mode of the touch input device according to the third embodiment of the present invention.
Figure 8:
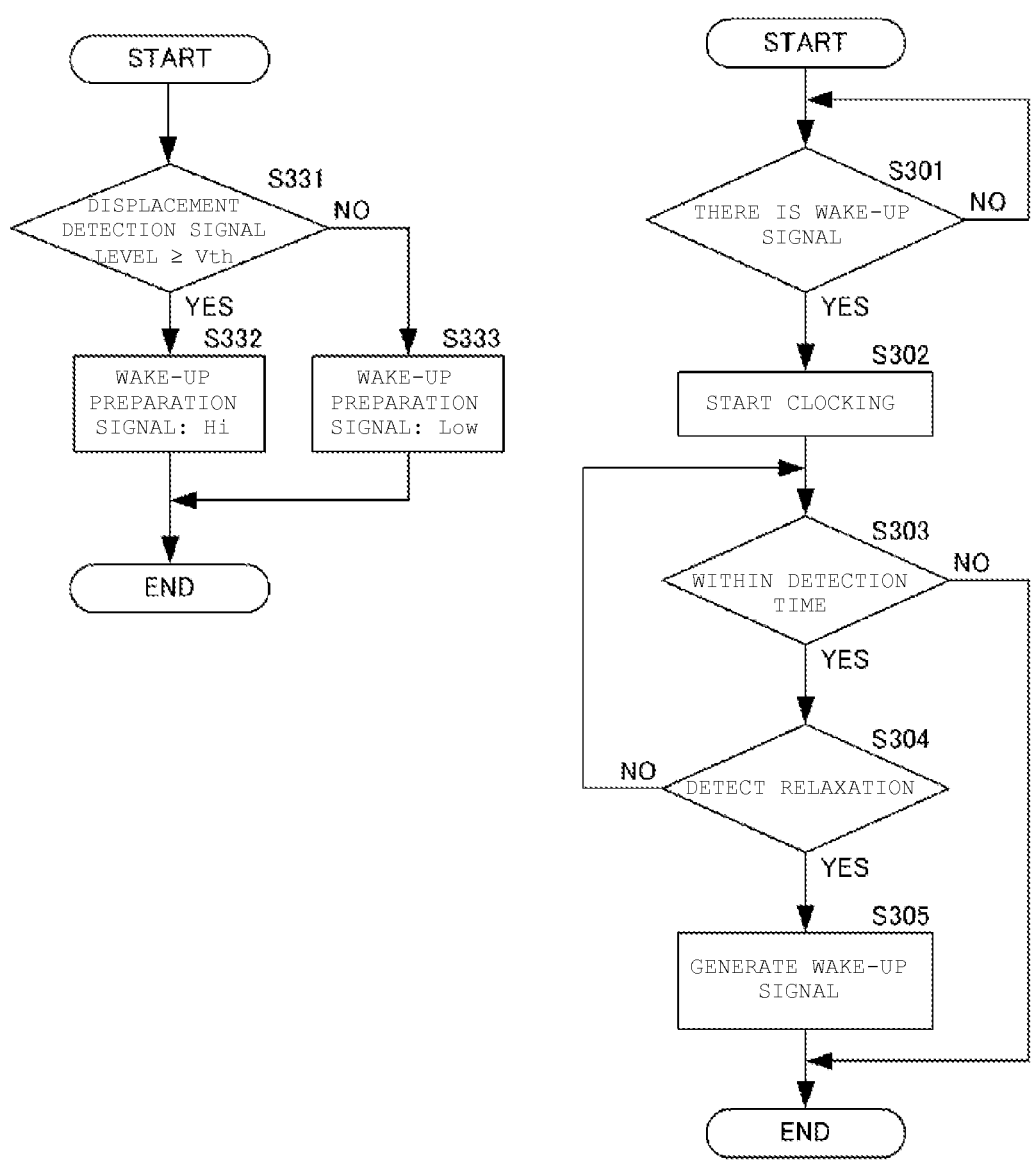
FIG. 8 is a flowchart illustrating a processing flow for generating a wake-up signal Swk according to the third embodiment of the present invention.

Next, a touch input device according to a third embodiment will be described with reference to the drawings. FIG. 6 is a block diagram of the touch input device according to the third embodiment of the present invention. FIG. 7 is a diagram illustrating transitions of a displacement detection signal, a wake-up signal and a device operation mode of the touch input device according to the third embodiment of the present invention. FIG. 8 is a flowchart illustrating a processing flow for generating a wake-up signal Swk according to the third embodiment of the present invention.

A touch input device 1A according to the present embodiment differs from the touch input device 1 according to the first embodiment in a configuration and processing of a touch sensor 10A and processing of a wake-up control unit 20. Hence, only different portions from the touch input device 1 according to the first embodiment will be more specifically described.

The touch sensor 10A includes a piezoelectric sensor 11P, a detection signal generating unit 12 and a preparation signal generating unit 13. The detection signal generating unit 12 outputs a displacement detection signal Sp to the wake-up control unit 20, and outputs a displacement detection signal Sp to the preparation signal generating unit 13 as well.

The preparation signal generating unit 13 generates a wake-up preparation signal Swp based on a voltage value of the displacement detection signal Sp, and outputs the wake-up preparation signal Swp to the wake-up control unit 20. The preparation signal generating unit 13 sets a detection threshold Vth of a higher voltage than a reference voltage Vst in advance. The preparation signal generating unit 13 compares the voltage value of the displacement detection signal Sp and the detection threshold Vth. In a period in which the voltage value of the displacement detection signal Sp is equal to the detection threshold Vth or more (S331: YES), the preparation signal generating unit 13 sets the wake-up preparation signal Swp in a Hi state (S332). In a period in which the voltage value of the displacement detection signal Sp is less than the detection threshold (S331: NO), the preparation signal generating unit 13 sets the wake-up preparation signal Swp in a Low state (S333).

By performing such processing, a time tp11 at which the voltage value of the displacement detection signal Sp reaches the detection threshold Vth from the reference voltage Vst can be set to a timing tcs at which the wake-up preparation signal Swp transitions from the Low state to the Hi state as illustrated in FIG. 7. Further, a time tp12 at which the voltage value of the displacement detection signal Sp lowers from the detection threshold Vth or more and becomes less than the detection threshold Vth can be set to a timing tce at which the wake-up preparation signal Swp transitions from the Hi state to the Low state. Consequently, the wake-up preparation signal Swp is outputted as a pulse signal which enters the Hi state in a period in which the operation surface is pushed and the displacement detection signal Sp maintains the detection threshold Vth or more. That is, by performing such processing, it is possible to generate a signal indicating detection of a push with respect to the operation surface.

The wake-up control unit 20 is in a sleep state until the wake-up preparation signal Swp of the Hi state is inputted (S301: NO). The wake-up control unit 20 is activated when the wake-up preparation signal Swp transitions to the Hi state, and enters a wake-up preparation state (S301: YES). The wake-up control unit 20 starts clocking at a transition timing to this Hi state as a clocking start time (S302). In this regard, a detection time ΔTc during which the clocking is to be performed is a time set in advance.

When the time is within the detection time ΔTc (S303: YES), the wake-up control unit 20 continues detecting a minimal value until relaxation of the push, i.e., the minimal value of the displacement detection signal Sp is detected (S304: No). In addition, the wake-up control unit 20 stops wake-up signal generation processing when relaxation of the push, i.e., the minimal value of the displacement detection signal Sp is not detected within the detection time ΔTc (S303: NO).

When detecting the minimal value of the displacement detection signal Sp, i.e., the relaxation of the push (S304: YES), the wake-up control unit 20 generates and outputs the wake-up signal Swk (S305).

The wake-up signal Swk is a pulse signal which transitions from a Low state to a Hi state at a detection timing td of relaxation of a push as a state transition timing twk as illustrated in, for example, FIG. 7, and maintains the Hi state for a predetermined period of time.

The electronic device to which the touch input device 1A is attached executes activation processing when receiving an input of the wake-up signal Swk of the Hi state. The electronic device transitions from a sleep state to an operation state, and executes a predetermined function.

Even by using the above configuration and processing, it is possible to prevent an erroneous activation of the electronic device similarly to the touch input device 1 according to the first embodiment.

Further, according to the configuration and the processing according to the present embodiment, the wake-up control unit 20 is in a sleep state until a push is detected, and only the touch sensor 10A is in operation in this period. Consequently, the touch input device 1A can be configured to save more power than the touch input device 1 described in the above embodiments.

Figure 9:
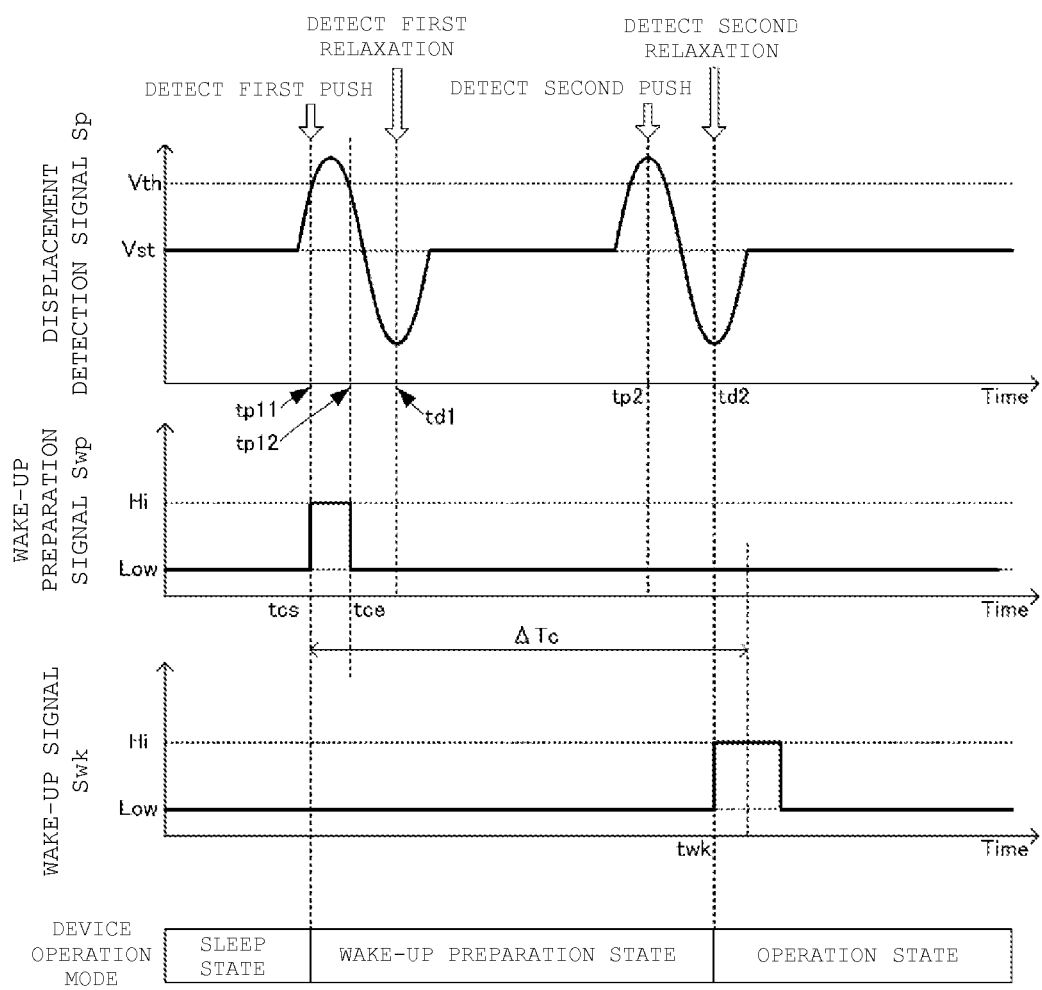
FIG. 9 is a diagram illustrating transitions of a displacement detection signal, a wake-up preparation signal, a wake-up signal and a device operation mode of a touch input device according to a fourth embodiment of the present invention.
Figure 10:
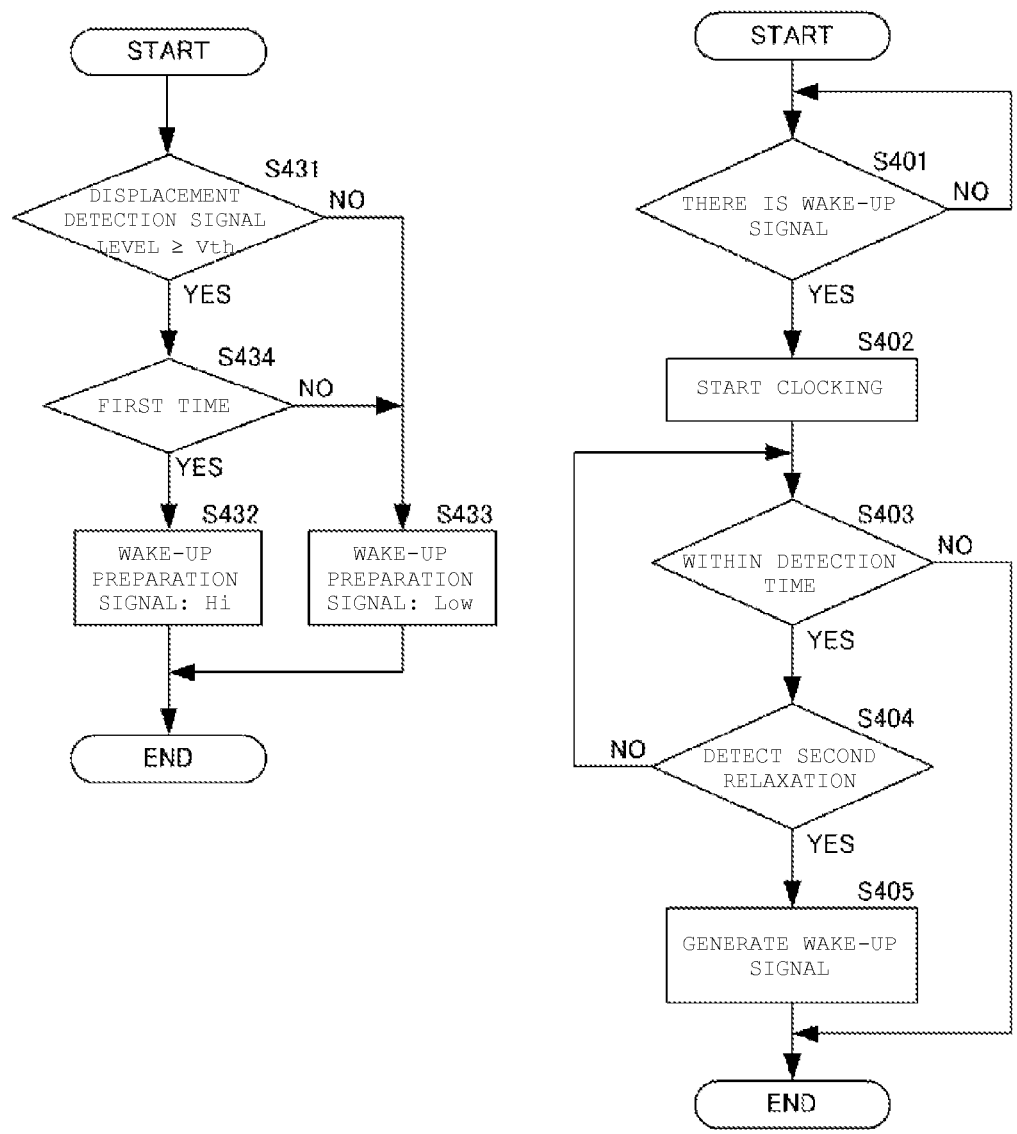
FIG. 10 is a flowchart illustrating a processing flow for generating a wake-up signal Swk according to the fourth embodiment of the present invention.

Next, a touch input device according to a fourth embodiment will be described with reference to the drawings. FIG. 9 is a diagram illustrating transitions of a displacement detection signal, a wake-up signal and a device operation mode of the touch input device according to the fourth embodiment of the present invention. FIG. 10 is a flowchart illustrating a processing flow for generating a wake-up signal Swk according to the fourth embodiment of the present invention.

A touch input device 1A according to the present embodiment employs the same configuration as that of a touch input device according to the third embodiment, and differs from the touch input device 1 according to the second embodiment in a configuration and processing of a touch sensor 10A and processing of a wake-up control unit 20. Hence, only different portions from the touch input device according to the second and third embodiments will be more specifically described.

The preparation signal generating unit 13 generates a wake-up preparation signal Swp based on a voltage value of the displacement detection signal Sp, and outputs the wake-up preparation signal Swp to the wake-up control unit 20. The preparation signal generating unit 13 compares the voltage value of the displacement detection signal Sp and a detection threshold Vth. In a period in which the voltage value of the displacement detection signal Sp is equal to the detection threshold Vth or more (S431: YES) and the push is the first push during a sleep state (S434: YES), the preparation signal generating unit 13 sets the wake-up preparation signal Swp in a Hi state (S432). In a period in which the voltage value of the displacement detection signal Sp is less than the detection threshold (S431: NO), the preparation signal generating unit 13 sets the wake-up preparation signal Swp in a Low state (S433). Further, when the voltage value of the displacement detection signal Sp is equal to the detection threshold Vth or more whereas the push is not the first push (S431: YES and S434: NO), the preparation signal generating unit 13 sets the wake-up preparation signal Swp in a Low state (S433).

By performing such processing, a time tp11 at which the voltage value of the displacement detection signal Sp reaches for the first time the detection threshold Vth from a reference voltage Vst in a sleep state can be set to a timing tcs at which the wake-up preparation signal Swp transitions from the Low state to the Hi state as illustrated in FIG. 9. Further, a time tp12 at which the voltage value of the displacement detection signal Sp lowers from the detection threshold Vth or more and becomes less than the detection threshold Vth for the first time can be set to a timing tce at which the wake-up preparation signal Swp transitions from the Hi state to the Low state. Consequently, the wake-up preparation signal Swp is outputted as a pulse signal which is set in the Hi state in a period in which an operation surface is pushed for the first time in the sleep state and the displacement detection signal Sp maintains the detection threshold Vth or more. That is, by performing such processing, it is possible to generate a signal indicating detection of a first push with respect to the operation surface.

The wake-up control unit 20 activates when the wake-up preparation signal Swp enters the Hi state, and detects that the operation surface has been pushed for the first time (first-pushed) (S401: YES). In this regard, the wake-up control unit 20 is in the sleep state until the first push is detected, i.e., the wake-up preparation signal Swp enters the Hi state (S401: NO).

When detecting that the operation surface has been first-pushed (S401: YES), the wake-up control unit 20 starts clocking based on this detection timing as a clocking start time tp1 (S402). In this regard, a detection time ΔTc during which the clocking is to be performed is a time set in advance similarly to the second embodiment.

When the time is within the detection time ΔTc (S403: YES), the wake-up control unit 20 continues detecting a second minimal value until relaxation of the second-time push (relaxation of the second push), i.e., a second-time minimum value (second minimal value) of the displacement detection signal Sp is detected (S404: No). In addition, the wake-up control unit 20 stops wake-up signal generation processing when relaxation of the second push, i.e., the second minimal value of the displacement detection signal Sp is not detected within the detection time ΔTc (S203: NO).

In this regard, relaxation of the second-time push is defined as follows. First, as illustrated in FIG. 9, relaxation of the first-time push (relaxation of the first push) is detected based on a voltage value of the displacement detection signal Sp. After the relaxation of the first-time push is detected, a second-time push (second push) and relaxation of the second-time push (relaxation of the second push) are detected based on a voltage value of the displacement detection signal Sp.

When detecting the second minimal value of the displacement detection signal Sp, i.e., the relaxation of the second push (S404: YES), the wake-up control unit 20 generates and outputs the wake-up signal Swk (S405). The wake-up signal Swk is a pulse signal which transitions from a Low state to a Hi state at a detection timing td2 of relaxation of a push as a state transition timing twk as illustrated in FIG. 9, and maintains the Hi state for a predetermined period of time.

The electronic device to which the touch input device 1A is attached executes activation processing when receiving an input of the wake-up signal Swk of the Hi state. The electronic device transitions from a sleep state to an operation state, and executes a predetermined function.

Even by using the above configuration and processing, it is possible to prevent an erroneous activation of the electronic device similarly to the touch input device 1 according to the second embodiment.

Further, according to the configuration and the processing according to the present embodiment, the wake-up control unit 20 is in a sleep state until a push is detected, and only the touch sensor 10A is in operation in this period. Consequently, the touch input device 1A can be configured to save more power than the touch input device 1 described in the above embodiments.

Figure 11:
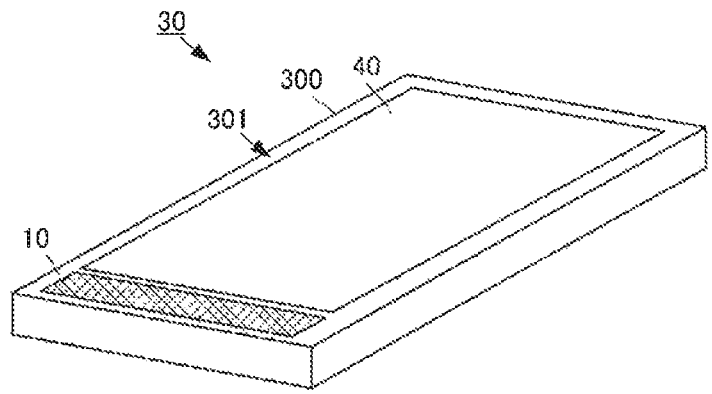
FIG. 11 is an external perspective view of an electronic device according to a first example.
Figure 12:
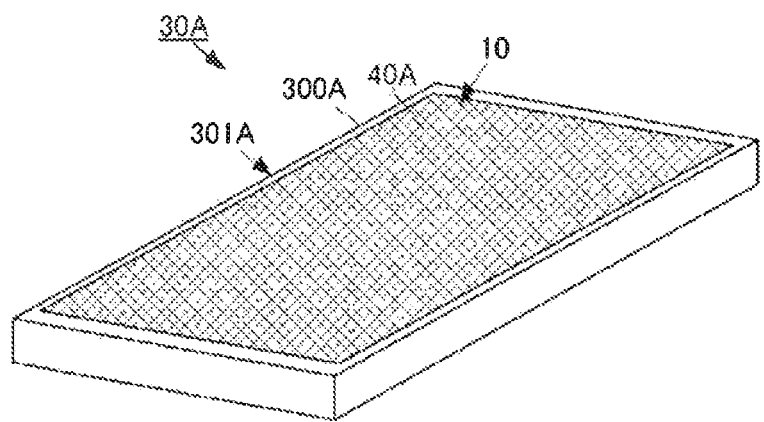
FIG. 12 is an external perspective view of an electronic device according to a second example.

In addition, the electronic device to which the above touch input device is attached employs, for example, the following configuration. FIG. 11 is an external perspective view of the electronic device according to the first example. FIG. 12 is an external perspective view of the electronic device according to the second example. In addition, FIGS. 11 and 12 illustrate a touch sensor 10, and the touch sensor 10A may be used.

An electronic device 30 according to the first example illustrated in FIG. 11 includes a housing 300 of a nearly cuboid shape having a portable size. The housing 300 has a roughly flat shape whose length and width are larger than the thickness. One flat surface of the housing 300 (a surface orthogonal to a thickness direction) is an operation surface 301. A display panel 40 is disposed on a nearly entire surface of the operation surface 301. The display panel 40 only needs to be a thin display, and is, for example, a liquid crystal display. On a region of the operation surface 301 on which the display panel 40 is not disposed, the touch sensor 10 of the touch input device is disposed. The touch sensor 10 is disposed on the operation surface 301 of the housing 300 such that the principal surface of a piezoelectric sensor 11P of the touch sensor 10 substantially matches the operation surface 301, and is parallel to the operation surface 301. FIG. 11 illustrates an example where the touch sensor 10 is disposed on the operation surface 301. However, the touch sensor 10 may be disposed on another surface of the housing 300.

A electronic device 30A according to the second example illustrated in FIG. 12 includes a housing 300A of a nearly cuboid shape having a portable size. The housing 300A also has a roughly flat shape similar to the housing 300 in FIG. 11. One flat surface of the housing 300 (a surface orthogonal to a thickness direction) is an operation surface 301A. A display panel 40A is disposed on a nearly entire surface of the operation surface 301A. The display panel 40A is a thin display. On a surface of the display panel 40A on the operation surface 301A, the touch sensor 10 of the touch input device is disposed. The touch sensor 10 is disposed on the operation surface 301 of the housing 300 such that the principal surface of a piezoelectric sensor 11P of the touch sensor 10 substantially matches the operation surface 301, and is parallel to the operation surface 301.

According to these electronic devices 30 and 30A, when contacting another object or receiving a strong shock, the touch sensors 10 of the operation surfaces 301 and 301A are easily pushed in. However, by using the touch input device 1 employing the above configuration, it is possible to prevent an erroneous activation of the electronic devices 30 and 30A caused by such an unintentional push.

Further, a material of a piezoelectric film which makes up the piezoelectric sensor 11P is preferably consisted as follows.

The piezoelectric film is made of uniaxially stretched poly-L-lactic acid (PLLA).

The PLLA is a chiral polymer, and a main chain adopts a helical structure. When the PLLA is uniaxially stretched and molecules are oriented, the PLLA has piezoelectricity. Further, the uniaxially stretched PLLA produces charges when the flat surface of the piezoelectric film is pushed. In this regard, the amount of produced charges is uniquely determined based on the displacement amount of the flat surface displaced in a direction orthogonal to the flat surface due to the push.

The piezoelectric constant of the uniaxially PLLA belongs to a type of high piezoelectric constant among polymers. Consequently, it is possible to detect displacement caused by a push and relaxation of the push with high sensitivity.

In addition, a stretching ratio is preferably about three to eight times. Applying heat processing to the PLLA after stretching encourages crystallization of extended chain crystal of polylactic acid, and improves a piezoelectric constant. In addition, when the PLLA is biaxially stretched, it is possible to provide the same effect obtained by uniaxially stretching the PLLA by varying stretching ratios of respective axis. When, for example, the PLLA is stretched eight times in a given direction defined as an X axis and the PLLA is stretched two times in a Y axis direction orthogonal to the X axis, it is possible to obtain the substantially same effect of a piezoelectric constant as that obtained by uniaxially stretching the PLLA four times in the X axis direction. A simply uniaxially stretched film is likely to be broken in a stretching axis direction, and therefore it is possible to enhance the strength to some degree by biaxially stretching the PLLA as described above.

Further, the PLLA produces piezoelectricity when molecules are oriented by way of stretching and the like, and therefore it is not necessary to perform a poling treatment unlike other polymers such as PVDF and piezoelectric ceramics. That is, piezoelectricity of the PLLA which does not belong to a ferroelectric does not arise upon polarization of ions unlike ferroelectrics such as PVDF and PZT, and derives from the helical structure which is a characteristic structure of molecules. Hence, the PLLA does not produce pyroelectricity, which is produced by other piezoelectric bodies having the ferroelectric property. Further, PVDF and the like temporally show a fluctuation in a piezoelectric constant, and the piezoelectric constant significantly lowers in some cases. However, the piezoelectric constant of the PLLA is very stable over time. Consequently, it is possible to detect displacement caused by a push and relaxation of the push with high sensitivity without being influenced by surrounding environment.

Further, a relative permittivity of the PLLA is about 2.5 and very low, and therefore when d is a piezoelectric constant and $\in^T$ is a dielectric constant, a piezoelectric output constant (=piezoelectric g constant, $g=d/\in^T$) takes a large value.

In this regard, the piezoelectric g constant of the PVDF in a case where dielectric constant $\in_{33}^T=13\times\in_0$, and piezoelectric constant $d_{31}=25$ pC/N hold takes $g_{31}=0.2172$ Vm/N. Meanwhile, when the piezoelectric g constant of the PLLA in a case where piezoelectric constant $d_{14}=10$ pC/N holds is converted into $g_{31}$ and is calculated as $d_{14}=2\times d_{31}$, $d_{31}=5$ pC/N holds and the piezoelectric g constant takes $g_{31}=0.2258$ Vm/N. Consequently, the PLLA of piezoelectric constant $d_{14}=10$ pC/N can sufficiently provide the same detection sensitivity of a push amount as that of PVDF. Further, the inventors of the present invention have empirically obtained the PLLA of $d_{14}=15$ to 20 pC/N, and, by using the PLLA, it is possible to detect a push and relaxation of the push with very high sensitivity.

Push detection conductors are formed in both principal surfaces of the piezoelectric film made of the PLLA having such a property according to a predetermined pattern. Organic electrodes whose main components are ITO, ZnO, silver nanowire and polythiophene, and organic electrodes whose main component is polyaniline are preferably used for the push detection conductors. By using these materials, it is possible to form a highly translucent conductor pattern. In addition, when transparency is not required, electrodes formed by silver paste and metal conductors formed by deposition, spattering and plating can also be used.

Further, an example where the piezoelectric sensor 11P is provided to the touch sensor has been described in the above embodiments. However, the piezoelectric sensor 11P, and an electrostatic sensor may be provided to the touch sensor. In this case, position detection conductors which make up the electrostatic sensor are more preferably formed in both surfaces of the piezoelectric film.

According to this configuration, when an operator's finger and the like touches the operation surface, a capacitance between the position detection conductors in the both surfaces changes at a touched position, and it is possible to obtain a touch signal corresponding to this capacitance. Consequently, it is possible to detect not only a displacement amount of a push with respect to the operation surface, but also a push position.

Consequently, by outputting this touch signal and the displacement detection signal Sp, it is possible to output a push amount and a push position to the electronic device.

Further, an example where a sensing signal from the piezoelectric sensor 11P is converted into the displacement detection signal Sp by performing predetermined processing in a detection signal generating unit 12 has been described in the above embodiments. However, it is also possible to output a sensing signal as is as the displacement detection signal Sp.

DESCRIPTION OF REFERENCE SYMBOLS 1,1A TOUCH INPUT DEVICE
10,10A TOUCH SENSOR
11P PIEZOELECTRIC SENSOR
12 DETECTION SIGNAL GENERATING UNIT
13 PREPARATION SIGNAL GENERATING UNIT
20 WAKE-UP CONTROL UNIT
30,30A ELECTRONIC DEVICE
300,300A HOUSING
301,301A OPERATION SURFACE
40,40A DISPLAY PANEL

The invention claimed is:

1. A wake-up signal generating device comprising:
   a touch sensor configured to generate a displacement detection signal corresponding to a displacement amount of an operation surface of the touch sensor; and
   a control unit configured to:
      detect a push operation of the operation surface when the displacement detection signal is greater than a predetermined voltage threshold, and
      generate a wake-up signal when the displacement detection signal reaches a minimal value within a predetermined time period from when the control unit detects the push operation.

2. The wake-up signal generating device according to claim 1, wherein the displacement amount of the operation surface is based on the push operation and relaxation of the push operation of the operation surface.

3. The wake-up signal generating device according to claim 1, wherein the wake-up control unit is configured to generate the wake-up signal when the displacement amount of a first displacement of the operation surface increases and then decreases due to an n-th displacement subsequent to the first displacement, wherein n is an integer greater than or equal to 2.

4. The wake-up signal generating device according to claim 3, wherein the control unit is configured to generate the wake-up signal when the decrease in the displacement amount of the n-th displacement is within the predetermined time from the increase in the displacement amount of the first displacement.

5. The wake-up signal generating device according to claim 1, wherein the touch sensor includes a wake-up preparation signal generating unit that is configured to:
   detect an increase in the displacement amount of the operation surface based on the displacement detection signal,
   generate a wake-up preparation signal, and
   output the wake-up preparation signal to the control unit.

6. The wake-up signal generating device according to claim 5, wherein the control unit is configured to detect the increase in the displacement amount based on the wake-up preparation signal.

7. The wake-up signal generating device according to claim 1, wherein the touch sensor includes:
   a displacement sensing element that generates a sensing signal corresponding to the displacement amount and a displacement direction; and
   a detection signal generating unit that slows a temporal displacement amount of the sensing signal and generates the displacement detection signal.

8. The wake-up signal generating device according to claim 7, wherein the displacement sensing element includes:
   a piezoelectric film disposed on the operation surface; and
   a conductor in the piezoelectric film.

9. The wake-up signal generating device according to claim 8, wherein the piezoelectric film comprises at least polylactic acid that is stretched in a uniaxial direction.

10. A touch input device comprising:
    a touch sensor configured to generate a displacement detection signal corresponding to a displacement amount of an operation surface of the touch sensor; and
    a control unit configured to:
       detect a push operation of the operation surface when the displacement detection signal is greater than a predetermined voltage threshold, and
       generate a wake-up signal when the displacement detection signal reaches a minimal value within a predetermined time period from when the control unit detects the push operation.

11. The touch input device according to claim 10, wherein the touch sensor includes a position detecting unit configured to detect a touch position of the operation surface and to generates a position detection signal based on the touch position, and wherein the control unit is configured to output the wake-up signal and the position detection signal.

12. A method for generating a wake-up signal, the method comprising:

generating, by a touch sensor, a displacement detection signal corresponding to a displacement amount of an operation surface of the touch sensor;

detecting, by a control unit, a push operation of the operation surface when the displacement detection signal is greater than a predetermined voltage threshold; and generating, by the touch sensor, a wake-up signal when the displacement detection signal reaches a minimal value within a predetermined time period from when the control unit detects the push operation.

13. The method for generating a wake-up signal according to claim 12, further comprising determining the displacement amount of the operation surface based on the push operation and relaxation of the push operation of the operation surface.

14. The method for generating a wake-up signal according to claim 12, further comprising generating the wake-up by the control unit when the displacement amount of a first displacement of the operation surface increases and then decreases due to an n-th displacement subsequent to the first displacement, wherein n is an integer greater than or equal to 2.

15. The method for generating a wake-up signal according to claim 14, further comprising generating, by the up control unit, the wake-up signal when the decrease in the displacement amount of the n-th displacement is within the predetermined time from the increase in the displacement amount of the first displacement.

16. The method for generating a wake-up signal according to claim 12, further comprising:

detecting, by a wake-up preparation signal generating unit, an increase in the displacement amount of the operation surface based on the displacement detection signal;

generating, by the wake-up preparation signal generating unit, a wake-up preparation signal; and outputting, by the wake-up preparation signal generating unit, the wake-up preparation signal to the control unit.

17. The method for generating a wake-up signal according to claim 16, further comprising detecting, by the wake-up control unit, the increase in the displacement amount based on the wake-up preparation signal.

18. The method for generating a wake-up signal according to claim 12, further comprising:

generating, by a displacement sensing element, a sensing signal corresponding to the displacement amount and a displacement direction;

slowing, by a detection signal generating unit, a temporal displacement amount of the sensing signal; and generating the displacement detection signal.

19. The method for generating a wake-up signal according to claim 18, wherein the displacement sensing element includes a piezoelectric film disposed on the operation surface; and a conductor in the piezoelectric film.

20. The method for generating a wake-up signal according to claim 19, wherein the piezoelectric film comprises at least polylactic acid that is stretched in a uniaxial direction.

21. The wake-up signal generating device according to claim 1, wherein the predetermined voltage threshold is a maximum value of the displacement detection signal.

22. The touch input device according to claim 10, wherein the predetermined voltage threshold is a maximum value of the displacement detection signal.

23. The method for generating a wake-up signal according to claim 12, wherein the predetermined voltage threshold is a maximum value of the displacement detection signal.

* * * * *